(12) United States Patent
Chan et al.

(10) Patent No.: US 8,495,350 B2
(45) Date of Patent: Jul. 23, 2013

(54) RUNNING OPERATING SYSTEM ON DYNAMIC VIRTUAL MEMORY

(76) Inventors: Kam Fu Chan, Hong Kong (CN); Bean Lee, Hong Kong (CN)

(*) Notice: Subject to any disclaimer, the term of this patent is extended or adjusted under 35 U.S.C. 154(b) by 1095 days.

(21) Appl. No.: 12/310,182

(22) PCT Filed: Aug. 23, 2006

(86) PCT No.: PCT/IB2006/052913
§ 371 (c)(1),
(2), (4) Date: Feb. 13, 2009

(87) PCT Pub. No.: WO2008/023220
PCT Pub. Date: Feb. 28, 2008

(65) Prior Publication Data
US 2009/0259836 A1  Oct. 15, 2009

(51) Int. Cl.
*G06F 9/00* (2006.01)
*G06F 12/08* (2006.01)

(52) U.S. Cl.
USPC ......... 713/2; 713/1; 713/100; 718/1; 718/100

(58) Field of Classification Search
USPC ................................ 713/1, 2, 100; 718/1, 100
See application file for complete search history.

(56) References Cited

U.S. PATENT DOCUMENTS

| | | | | |
|---|---|---|---|---|
| 6,754,746 | B1 * | 6/2004 | Leung et al. | 710/100 |
| 7,937,575 | B2 * | 5/2011 | Hajji et al. | 713/1 |
| 2008/0028052 | A1 * | 1/2008 | Currid et al. | 709/222 |

* cited by examiner

*Primary Examiner* — Kim Huynh
*Assistant Examiner* — Michael J Brown
(74) *Attorney, Agent, or Firm* — Buchanan Ingersoll & Rooney PC

(57) ABSTRACT

A method making possible booting up and running a system image of an operating system together with diskspace or drivespace, either free or stored with data or application files, for use on the type of storage medium, such as but not limited to internal physical memory or internal RAM, that virtual memory allocated out of the system memory pool upon boot-up can be and is used for mapping for access of such type of storage medium by the operating system under concern in device(s), including computer system(s) or computer-controlled device(s) or operating-system-controlled device(s) capable of running the operating system under concern.

13 Claims, No Drawings

RUNNING OPERATING SYSTEM ON DYNAMIC VIRTUAL MEMORY

BACKGROUND OF THE PRESENT INVENTION

1. Field of Invention

This invention relates to running operating system in device(s), including computer system(s) or computer-controlled device(s) or operating-system-controlled device(s). Such device(s) is/are mentioned hereafter as Device(s).

In particular, this invention relates to operating systems to which this invention can be and is applied; this invention being a method, capable of being implemented in computer-executable or operating-system-executable instructions or programmes, providing for running operating system on virtual system memory address space, being dynamically mapped onto a storage medium, such as but not limited to internal physical memory or internal Random Access Memory (RAM or ram used hereafter), in or accessible to the Device(s) capable of running the operating system under concern.

In this relation, it makes possible, in the Device(s) capable of running the operating system under concern, the phenomenon of booting up and running operating system with the use of virtual disk driver on virtual system memory, the virtual system memory being dynamically mapped onto storage medium for its access.

2. Description of Related Arts

Since Microsoft Windows is the most popular operating system used nowadays, it is taken here as an example for illustrating how this invention can be carried out. This invention however can be applied to other operating systems with similar designs.

Normally, operating systems run up from and on fixed internal IDE/SCSI hard disk(s) of a local computer system or operating-system-controlled device or on the network fileserver of a network computer. Attempts however have been made to run operating systems in other ways. Using Microsoft Windows as an example, the solution of creating a CD capable of booting the full Microsoft Windows 98 at http://www.ct.heise.de/ct/english/99/!1/206/ put forward by Tobias Remberg and Hajo Schulz provides a suggested solution for creating a bootable CD for running up Microsoft Windows 98. Besides this, Microsoft Windows Pre-installed Environment now can also run up on a live CD or DVD or be loaded up from hard disk to run as ramdisk-based. So it is now a common phenomenon to boot up Microsoft Windows from a local IDE/SCSI hard disk, from a CD or DVD, from a USB storage device or from a network fileserver or in hand-held device(s) to run as a ramdisk-based operating system.

So given time and will, Microsoft Windows can be made to boot up from more and more types of storage medium through designing and implementing the corresponding boot-up device drivers for accessing such types of storage medium. For certain type of storage medium, such as but not limited to internal RAM within a computing system, to be used for storing and booting up the system image of certain versions of Microsoft Windows, such as Microsoft Windows 2000 and XP, boot-up device driver has to be designed and implemented in such a way that the storage medium, for instance the internal RAM, is made available to the operating system for boot-up and subsequent use through allocating virtual memory out of the system memory pool and mapping such virtual memory onto the storage space of the internal RAM.

SUMMARY OF THE PRESENT INVENTION

Technical Problem

For this type of storage medium, for instance internal RAM, on which the maximum size of the operating system image that can be stored for booting up the operating system is normally limited by the size of the virtual memory that can be allocated out of the system memory pool. For instance, Microsoft Corporation itself has implemented a version of Microsoft Windows XP that can be booted up and run in RAM, called XP Embedded, which has a maximum size limitation of about 512 MB. This can be seen from Microsoft Corporation's official website at: http://msdn.microsoft.com/library/default.asp?url=/library/en-us/dnxpespl/html/winxpfaq.asp which says the SDI (System Deployment Image) must be created from a target partition of less than 500 MB and the relevant text is quoted verbatim below: "Import the target partition into the SDI. The target partition should typically be an SDI Disk partition mounted by SDI Loader and formatted with the Disk Management Console. The size of the partition must be less than 500 MB."

This maximum size limit is due to the result of using static mapping of system memory allocated out of the system memory pool onto the storage address space of the internal RAM of the computer system. It is found that for a 32-bit system, the maximum size of virtual memory that can be allocated out of the system memory pool for use by a virtual disk boot-up device driver is in the range of 780 MB to 790 MB.

So using static mapping of virtual memory allocated out of the system memory pool for creating a boot-up virtual disk in the internal RAM for booting up the operating system can only boot up a system image of the operating system, the maximum size of which is subject to the maximum size limit of the virtual memory that can be allocated out of the system memory pool upon boot-up. In the case of 32-bit Microsoft Windows XP, it is in the range of 780 MB to 790 MB.

The 32-bit Microsoft Windows XP requires a hard disk partition of the size of at least about 1.4 GB for its full installation. So it is quite difficult to store the whole system image into a virtual disk entirely in internal RAM of size of about 780 MB to 790 MB without using compressed NTFS partition format. So downsizing of the system image is required and that compromises its functionalities.

Furthermore, if all the boot-up virtual disk space in internal RAM is taken up and occupied by the system image of the operating system, there is little space on the boot-up virtual disk for setting up other useful applications for use. This means that other physical storage medium such as hard disk has to be used for such purpose. And this makes the use of hard-diskless mobile computer unlikely achievable.

What is more, if all the virtual memory that can be claimed from the system memory pool is allocated for creating the boot-up ramdisk, there is little free system memory left that can be used by other device drivers or processes that require the use of such global system memory.

It has been tested that the 32-bit Microsoft Windows XP can be run up in a computer with 4 GB physical RAM installed. Using static mapping of virtual memory for creating boot-up virtual disk in internal RAM as described above cannot maximize the use of the 4 GB physical RAM installed for running the operating system as ramdisk-based and suffers from other disadvantages described above. For instance, using Microsoft Corporation's own XP Embedded, one can only use a boot-up ramdisk of only about 500 MB in size, even if one has 4 GB RAM installed in the computer. This leaves much to be desired.

Technical Solution

The technical solution to the problems described above is to employ dynamic mapping of virtual memory allocated out of the system memory pool upon boot-up onto the storage address space of the storage medium, such as the internal RAM, for the creation of a boot-up virtual disk that can maximize the use of the largest possible amount of internal RAM installed in the computing system.

Dynamic mapping of virtual memory onto different parts of address space of storage medium, such as the internal physical memory or internal RAM, together with the swapping in and out of the content of pages of virtual memory into swap file found on other physical storage medium, such as hard disk, is a very well known technique that is commonly applied by operating systems, such as Linux, Microsoft Windows and the like, for solving the problem of inadequate internal physical memory or internal RAM for use by these operating systems or user applications for various purposes.

There also has been mention of the use of dynamic mapping of virtual memory onto external physical memory found within peripheral device for conserving the use of system memory, for instance for driving graphic cards, as referenced in a United States Patent, U.S. Pat. No. 7,065,630, entitled "Dynamically creating or removing a physical-to-virtual address mapping in a memory of a peripheral device".

But there has never been a revelation on how to make use of dynamic mapping of virtual memory for booting up and running these operating systems themselves on the type of storage medium, such as but not limited to internal RAM, that can overcome the technical problems mentioned above; such type of storage medium (referred hereafter as Virtually Mapped Storage Medium) being that upon which mapping of virtual memory allocated out of the system memory of the operating system under concern can be and is used for its access by the operating system under concern upon boot-up.

These and other objectives, features, and advantages of the present invention will become apparent from the following detailed description, the accompanying drawings, and the appended claims.

DETAILED DESCRIPTION OF THE PREFERRED EMBODIMENT

Basically, for overcoming the technical problems mentioned above, this invention reveals a method comprising the steps of:

(1) booting up the Device and storing a Boot-up Image (i.e. a bootable system image of the operating system under concern, together with other applications and data files if any) onto the storage medium (Virtually Mapped Storage Medium) upon which mapping of virtual memory allocated out of the system memory of the operating system under concern can be and is used for its access by the operating system under concern upon the boot-up of the operating system; and (2) booting up the operating system under concern on the Virtually Mapped Storage Medium and executing computer-executable or operating-system-executable instructions or programmes, such as described herein as a virtual disk driver, for dynamically mapping virtual memory allocated out of the system memory pool of the operating system onto the storage address space of the Virtually Mapped Storage Medium so that the Virtually Mapped Storage Medium can be and is used for the subsequent booting and use of the Boot-up Image in the virtual disk(s) so created by the virtual disk driver in the Device in which the operating system runs.

Using operating systems of the Microsoft Windows 2000/XP family as an example,

Step (1) above can be further illustrated in the following sub-steps:

(1)(a) The Device powers up;

(1)(b) BIOS or the boot-up codes of the Device run the POST test, and the boot-up codes then transfer the control to the MBR of the boot-up disk or boot-up storage medium of the boot-up device of the Device;

(1)(c) MBR loads a boot manager;

(1)(d) The boot manger loads or copies the Boot-up Image to the Virtually Mapped Storage Medium, in this case a range of storage space of the internal RAM; and (1)(e) The boot manager then modifies INT 13, and BIOS disk access routines, so that Real Mode programs can access the Boot-up Image on the Virtually Mapped Storage Medium just like normal hard disk(s). Boot managers that can accomplish this include for intances grub4dos and syslinux with the use of memdisk on a standalone Device or pxe-grub4dos and pxelinux with the use of memdisk on a networked Device.

Continuing with the example used above, Step (2) above can be further illustrated in the following sub-steps:

(2)(a) The boot manager transfers control to the bootloader of the operating system, in this example, the NT loader, ntldr, of the operating systems of the Microsoft Windows 2000/XP family;

(2)(b) The bootloader of the operating system reads its boot-up configuration information (in this example, the NT loader reads boot.ini), and then uses the specified setting to load the kernel of the operating system. At this stage, the disk reading is still using INT 13;

(2)(c) The kernel of the operating system (in this example, the NT kernel) does some initialization, and then loads services that must be loaded at boot time, among them the virtual disk driver for accessing the Virtually Mapped Storage Medium for the creation of virtual disk(s) encompassing the Boot-up Image stored therein;

(2)(d) Boot-up services loaded up by the kernel of the operating system start to initialize. At this stage, the virtual disk driver initializes; and for indirect dynamic mapping, the virtual disk driver creates memory buffer(s) for buffering purpose, whereas for direct dynamic mapping no buffering is required. After initialization, the virtual disk driver starts to manage the process of dynamically mapping virtual memory allocated out of the system memory pool of the operating system onto the storage address space of the Virtually Mapped Storage Medium so that the Virtually Mapped Storage Medium can be and is used for the subsequent booting and use of the Boot-up Image in the virtual disk(s) so created by the virtual disk driver in the Device in which the operating system runs.; and (2)(e) The kernel of the operating system (in this example, the NT kernel) starts to load other system services. At this stage, the virtual disk driver is up and running, all disk access to the virtual disk(s) created on the Virtually Mapped Storage Medium containing the Boot-up Image is handled by the virtual disk driver. To the kernel, the virtual disk(s) so created function(s) just like hard disk(s).

Sophisicated operating systems, such as Microsoft Windows and Linux and the like, are usually designed with built-in executable routines or memory management functions for managing mapping of virtual system memory onto physical memory. In the case of the operating systems of 32 bit Microsoft Windows 2000/XP family, the system can have 4 G of virtual system memory space for use. Normally, the lower 2 G is reserved for user processes, and the upper 2 G is for kernel use and is split in two halves, IG for shared codes like dlls, IG for drivers with kernel privileges. So the virtual system memory that can be used by kernel drivers is limited. If Boot-up Image to be managed by the virtual disk driver is too large in size, there will be not enough virtual system memory for doing static one to one mapping. To solve this problem, dynamic mapping between the virtual system memory and the physical memory has to be used. Using methods of dynamic mapping, a limited amount of virtual system memory address space can be used for accessing virtually unlimited amount of address space of Virtually Mapped Storage Medium, such as internal physical memory.

There can be many variations for implementing dynamic mapping mentioned above. The two methods of dynamic mapping described hereafter are for illustrating how dynamic mapping can be used for solving the technical problems mentioned above. And each embodiment of dynamic mapping methods described here can also have slight implementation variations that implementators can choose and decide. So the description below is not meant to be exhaustive, but enough details are revealed about how in general dynamic mapping can be implemented and used for the purposes of this invention so those skilled in the art can implement this invention according to choice of implementation variations.

So in relation to the implementation of virtual disk driver for managing the process of dynamically mapping virtual memory allocated out of the system memory pool of the operating system onto the storage address space of the Virtually Mapped Storage Medium so that the Virtually Mapped Storage Medium can be and is used for the subsequent booting and use of the Boot-up Image in the virtual disk(s) so created by the virtual disk driver in the Device in which the operating system runs, Step (2)(d) above can be further illustrated with the following two methods of dynamic mapping; the first one being direct dynamic mapping and the second being indirect dynamic mapping. So branching out from Step (2)(d) above are referred hereafter as Step (3)(a), being the method of direct dynamic mapping, and Step (3)(b) being the method of indirect dynamic mapping.

The sub-steps for implementing direct dynamic mapping, Step (3)(a), by the virtual disk driver for accessing the virtual disk(s) containing the Boot-up Image are as follows:

(3)(a)(i) When the kernel reads from/writes to the virtual disk, it passes to the virtual disk driver the linear address, an offset address from the beginning of the virtual disk which is calculated from upper level filesystem drivers, and a byte count as well as a system output buffer;

(3)(a)(ii) Inside the virtual disk driver, memory block is used as a basic unit (block size can be configured according to choice). The virtual disk driver translates the linear address to a block index and a block offset according to the following formulae:

block index=linear address DIV block size block offset=linear address MOD block size (3)(a)(iii) The virtual disk driver looks up the block index in a mapping table. This process can use the algorithm of choice such as a hashing of choice to improve performance;

(3)(a)(iv) If a match is found, the virtual disk driver extracts the virtual memory address from the mapping table, and then bypasses Step (3)(a)(v), Step (3)(a)(vi) and Step (3)(a)(vii) and jumps to take Step (3)(a)(viii) only. If no match is found, the virtual disk driver goes to take Step (3)(a)(v);

(3)(a)(v) The virtual disk driver looks up for an empty slot in the mapping table. If an empty slot is found, it bypasses Step (3)(a)(vi) and jumps to take Step (3)(a)(vii). If an empty slot is not found, it goes to take Step (3)(a)(vi);

(3)(a)(vi) The virtual disk driver identifies and frees a slot in the mapping table by releasing a virtual to physical mapping that is least needed. The virtual disk driver calls the memory management function, that is usually provided by the operating system, to release the mapping. The algorithm to identify the slot to be freed can vary according to choice, such as based on Least Recently Used (LRU), Least Frequently Used (LFU), First-In-First-Out (FIFO) principle, etc;

(3)(a)(vii) The virtual disk driver uses memory management function, that is usually provided by the operating system, to create a mapping between a virtual memory and the physical memory pointed to by the block index by using the following formula:

physical memory address=virtual disk base address+ block index*block size

The mapping is stored in the newly found or freed slot. The new virtual memory address returned by the memory management function used above is used in the next Step (3)(a)(viii); and (3)(a)(viii) For a read operation, the virtual disk driver copies data from the virtual memory address to the system output buffer after adding the block offset. For a write operation, it copies data from the the system output buffer to the virtual memory address after adding the block offset. If reading/writing involves crossing block boundary, only the bytes within the current block, i.e. the block specified by the block index, are read/written. After that, the block index increases by 1, and the processing jumps back to take Step (3)(a)(iii) and continues, until all bytes are read/written.

The virtual disk driver can also use indirect dynamic mapping. This indirect dynamic mapping is a variation to the direct dynamic mapping described above in Step (3)(a). It requires that some memory buffer(s) to be allocated to hold the content of frequently accessed blocks in addition to and modifying the operation of direct dynamic mapping. The sub-steps for implementing indirect dynamic mapping, Step (3)(b), by the virtual disk driver for accessing the virtual disk(s) containing the Boot-up Image are as follows:

(3)(b)(i) When the kernel reads from/writes to the virtual disk, it passes to the virtual disk driver the linear address, an offset address from the beginning of the virtual disk which is calculated from upper level filesystem drivers, and a byte count as well as a system output buffer;

(3)(b)(ii) Inside the virtual disk driver, memory block is used as a basic unit (block size can be configured according to choice). The virtual disk driver translates the linear address to a block index and a block offset according to the following formulae:

block index=linear address DIV block size block offset=linear address MOD block size (3)(b)(iii) The virtual disk driver looks up the block index in a mapping table. This process can use the algorithm of choice such as a hashing of choice to improve performance;

(3)(b)(iv) If a match is found, the virtual disk driver extracts the memory buffer address from the mapping table, and then bypasses Step (3)(b)(v), Step (3)(b)(vi) and Step (3)(b)(vii) and jumps to take Step (3)(b)(viii) only. If no match is found, the virtual disk driver goes to take Step (3)(b)(v);

(3)(b)(v) The virtual disk driver looks up for an empty slot in the mapping table. If an empty slot is found, it bypasses Step (3)(b)(vi) and jumps to take Step (3)(b)(vii). If an empty slot is not found, it goes to take Step (3)(b)(vi);

(3)(b)(vi) The virtual disk driver identifies and frees a slot in the mapping table that is least needed. The algorithm to identify the slot to be freed can vary according to choice, such as based on Least Recently Used (LRU), Least Frequently Used (LFU), First-In-First-Out (FIFO) principle, etc. If the memory buffer in the identified slot to be freed (the target slot) is marked dirty, its content should be written back to the Virtually Mapped Storage Medium, in this case of example the physical memory of the virtual disk image. If the target slot is not marked dirty, no such writing is required. The virtual disk driver does this writing by performing the following sub-steps:

In the first sub-step, it calculates a physical address corresponding to the block index in the target slot. The formula for this calculation is as follows:

physical memory address=virtual disk base address+
block index*block size

In the second sub-step, the virtual disk driver then creates a virtual to physical memory mapping, using memory management function that is usually provided by the operating system.

In the third sub-step, the virtual disk driver writes data from memory buffer in the target slot to the virtual memory address generated in the second sub-step of (3)(b)(vi) here above.

And then finally the virtual disk driver releases the virtual to physical mapping just created in the second sub-step of (3)(b)(vi) here above;

(3)(b)(vii) The virtual disk driver uses memory management function, that is usually provided by the operating system, to create a mapping between a virtual memory and the physical memory pointed to by the current block index by using the following formula:

physical memory address=virtual disk base address+
block index*block size

The virtual disk driver then reads data from virtual address to memory buffer, then releases the mapping; and (3)(b)(viii) For a read operation, the virtual disk driver copies data from the memory buffer to the system output buffer after adding the block offset. For a write operation, the virtual disk driver copies data from the system output buffer to the memory buffer after adding the block offset, and marks the memory buffer dirty. If the reading/writing involves crossing block boundary, only the bytes within the current block, i.e. the block specified by the block index, are read/written. After that, block index increases by 1, and the processing jumps back to take Step (3)(b)(iii) and continues, until all bytes are read/written.

The method of indirect dynamic mapping as described in Step (3)(b) seems to be superfluous or less optimal as a solution when compared with the method of direct dynamic mapping described in Step (3)(a) if the Virtually Mapped Storage Medium is in the form of internal physical memory within the Device. However, if the Virtually Mapped Storage Medium is a type of storage medium other than the type of storage medium that is used for buffering, resulting that the speed of access to the Boot-up Image is faster through the use of indirect dynamic mapping than direct dynamic mapping, then the indirect dynamic mapping with buffering can be a preferred choice over the method of dynamic mapping without buffering.

Advantageous Effects

This invention makes it possible for booting up and running a system image of an operating system together with diskspace or drivespace, either free or stored with data or application files, for use on Virtually Mapped Storage Medium by the operating system under concern in device(s), including computer system(s) or computer-controlled device(s) or operating-system-controlled device(s) capable of running the operating system under concern.

So for instance, a full version of Microsoft Windows XP system image together with a lot of data files, applications files and free diskspace or drivespace can be booted up and run on a boot-up ramdisk of the largest possible size without depleting the system memory for use by other device drivers or by the operating system for running other applications. This makes possible the use of, for instance, diskless and wireless Ultra Mobile Personal Computer (UMPC) anywhere with, say, 4 GB internal RAM. The use of the operating system in a ramdisk-based hard-diskless UMPC can save power consumption for and the wear-and-tear on the hard disk, protect the hard disk from virus infection, restore a clean operating system image for use on ramdisk instantly, increase mobility and handy use through the possibility of removing hard disk, etc.

This also applies to booting up operating system images from storage media other than internal RAM; these other storage media (Virtually Mapped Storage Media) being those upon which mapping of virtual memory allocated out of the system memory of the operating system under concern can be and is used for their access by the operating system under concern upon boot-up. Examples of these other Virtually Mapped Storage Media are further described in the section on Mode of Invention below.

Best Mode

At present, the best mode for carrying out this invention is therefore to use the internal physical memory as the Virtually Mapped Storage Medium and the method of direct direct mapping is used for accessing the Boot-up Image in Device(s).

Mode for Invention

IBM has obtained a United States Patent, U.S. Pat. No. 7,017,024, entitled "Data processing system having no system memory". In this IBM invention, through hardware implementation, the system memory in the form of physical memory in a data processing system can be dispensed with and the system memory is virtualized onto a hard disk. And in one embodiment, many to one mapping or Aliasing between virtual system memory address and the physical address of the hard disk (now the virtualized system memory) is allowed. In this way, the hard disk is now used as the ordinary physical memory as in the conventional data processing system before this IBM invention. So the methods of both direct dynamic mapping and indirect dynamic mapping described above can be applied onto such hard disk as mentioned in the IBM invention for running the operating system under concern on dynamic virtual memory.

In such way, the running speed of the hard disk may be slower than that of the physical memory in acting as the system memory, but as a compensation, the IBM invention provides speed improvements through the use of hardware for implementing the functions of Virtual Memory Manager. On the other hand, the speed of access can further be improved through integration of DRAM (Dynamic Random Access Memory) hard disk into the IBM invention. That is, instead of using the traditional non-volatile hard disk storage medium, DRAM modules are used as the storage medium representing a hard disk. For instance, Giga-byte Technology Company Limited has released such an implementation, called I-RAM card. So implementing the present invention together with the IBM invention mentioned above and the use of DRAM hard disk, there could be much speed improvement in accessing the Boot-up Image for running operating systems in such Device(s). It also provides the possibility and flexibility in providing additional and easily extensible system memory whether in the form of non-volatile or DRAM hard disk.

INDUSTRIAL APPLICABILITY

The running of operating systems on dynamic virtual memory can be used in all types of device(s), including computer system(s) or computer-controlled device(s) or operating-system-controlled device(s). This present invention can be implemented in the ordinary desktop PCs, notebook PCs, UMPCs (Ultra Mobile Personal Computers) and the like. As described in the section on Mode of Invention above, it can even be applied in devices adopting the aforesaid IBM invention, having system memory virtualized on hard disk. Implementing the present invention in Device(s) thus said therefore renders all of these Device(s) the advantages described in the section on Advantages Effects above.

One skilled in the art will understand that the embodiment of the present invention as shown in the drawings and described above is exemplary only and not intended to be limiting. It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method, implemented in computer-executable instructions of an operating system on a virtual system memory address space, through dynamically mapping virtual system memory for booting up a Boot-up Image on a Virtually Mapped Storage Medium of an operating-system-controlled device, the method comprising:
   (1) booting up the device and storing a Boot-up Image onto the Virtually Mapped Storage Medium;
   (2) booting up the operating system on the Virtually Mapped Storage Medium; and
   (3) executing computer-executable instructions of a virtual disk driver, for dynamically mapping virtual memory allocated out of the system memory pool of the operating system onto the storage address space of the Virtually Mapped Storage Medium so that the Virtually Mapped Storage Medium can be used for subsequent booting of the Boot-up Image in one or more virtual disks created by the virtual disk driver loaded up in the device in which the operating system runs.

2. The method of claim 1, wherein (1) further comprises:
   (a) powering the device;
   (b) running boot-up codes of the device for a POST test;
   (c) transferring control to an MBR of a boot-up storage medium of a boot-up device of the device;
   (d) loading, by the MBR, a boot manager;
   (e) copying, by the boot manager, the Boot-up Image to the Virtually Mapped Storage Medium; and
   (f) modifying, by the boot manager, INT 13, and BIOS disk access routines, so that one or more Real Mode programs can access the Boot-up Image on the Virtually Mapped Storage Medium.

3. The method of claim 1, wherein (2) further comprises:
   (a) transferring control, by the boot manager, to a bootloader of the operating system;
   (b) reading, by the bootloader, its boot-up configuration information;
   (c) loading, by the bootloader with the use of a specified setting, a kernel of the operating system;
   (d) initializing the kernel of the operating system;
   (e) loading, by the kernel, boot-time services, including the virtual disk driver for accessing the Virtually Mapped Storage Medium for the creation of one or more virtual disks encompassing the Boot-up Image stored therein;
   (f) initializing boot-time services loaded up by the kernel of the operating system wherein the initializing comprises managing, by the virtual disk driver, the process of dynamically mapping virtual memory allocated out of the system memory pool of the operating system onto the storage address space of the Virtually Mapped Storage Medium so that the Virtually Mapped Storage Medium can be used for subsequent booting and use of the Boot-up Image in the one or more virtual disk created by the virtual disk driver in the device in which the operating system runs;
   (g) loading, by the kernel of the operating system, other system services; and
   (h) handling, by the virtual disk driver, access to the one or more virtual disk created on the Virtually Mapped Storage Medium containing the Boot-up Image.

4. The method of claim 1, wherein the device is one or more of a computer system, a computer-controlled device and an operating-system-controlled device.

5. A method implemented in computer-executable instructions of a virtual disk driver for running a Boot-up Image on a virtual system memory address space mapped on a Virtually Mapped Storage Medium in a device, the method comprising:
   (1) initializing, by the virtual disk driver, a linear address, an offset address from the beginning of the virtual disk which is calculated from upper level file system drivers, a byte count, and a system output buffer;
   (2) translating, by the virtual disk driver, the linear address to a block index and a block offset according to the following formula: block index=linear address DIV block size block offset=linear address MOD block size;
   (3) looking up, by the virtual disk driver, the block index in a mapping table using an algorithm such as a hashing of choice;
   (4) in response to determining that a match is found, extracting, by the virtual disk driver, the virtual memory address from the mapping table, and then proceeding to (8);
   (5) in response to determining that no match is found, looking up, by the virtual disk driver, looks up for an empty slot in the mapping table;
   (6) in response to determining that an empty slot is not found, identifying and freeing, by the virtual disk driver, a slot in the mapping table by releasing a virtual to physical mapping that is least needed; and
   calling, by the virtual disk driver, the memory management function to release the mapping, wherein an algorithm to identify the slot to be freed can be based on one or more of: Least Recently Used (LRU), Least Frequently Used (LFU), and First-In-First-Out (FIFO);
   (7) creating, by the virtual disk driver using a memory management function, a mapping, stored in the newly found or freed slot, between a virtual memory and the physical memory pointed to by the block index by using the following formula: physical memory address=virtual disk base address+block index*block size The mapping is stored in the newly found or freed slot;

(8) copying, for a read operation, by the virtual disk driver, data from the virtual memory address to the system output buffer after adding the block offset; and (9) copying, for a write operation, by the virtual disk driver, data from the system output buffer to the virtual memory address after adding the block offset;

wherein if reading or writing involves crossing a block boundary, only the bytes within the current block specified by the block index are read or written and the block index subsequently increases by 1, and the processing repeats (3) and continues, until all bytes are read or written.

6. The method of claim 5, wherein the device is one or more of a computer system, a computer-controlled device and an operating-system-controlled device.

7. A method, implemented in computer-executable instructions of a virtual disk driver, for providing for running a Boot-up Image on a virtual system memory address space mapped on a Virtually Mapped Storage Medium in a device, the method comprising:

(1) initializing and creating, by the virtual disk driver, a memory buffer;

(2) in response to reading from or writing to the virtual disk, passing, by the kernel, to the virtual disk driver, the linear address, an offset address from the beginning of the virtual disk which is calculated from upper level file system drivers, a byte count, and a system output buffer;

(3) translating, by the virtual disk driver, the linear address to a block index and a block offset according to the following formula: block index=linear address DIV block size block offset=linear address MOD block size;

(4) looking up, by the virtual disk driver, the block index in a mapping table using an algorithm such as a hashing of choice;

(5) in response to determining that a match is found, extracting, by the virtual disk driver, a memory buffer address from the mapping table, and proceeding to (12);

(6) in response to determining that no match is found, looking up, by the virtual disk driver an empty slot in the mapping table;

(7) in response to determining that an empty slot is found, proceeding to (9);

(8) in response to determining that an empty slot is not found, identifying and freeing, by the virtual disk driver, a slot in the mapping table that is least needed;

(9) creating, by the virtual disk driver using a memory management function, a mapping between a virtual memory and the physical memory pointed to by the current block index by using the following formula: physical memory address=virtual disk base address+block index*block size;

(10) reading, by the virtual disk driver, then reads data from a virtual address to a memory buffer;

(11) releasing the mapping;

(12) copying, for a read operation, by the virtual disk driver, data from the memory buffer to the system output buffer after adding the block offset; and

(13) copying, for a write operation, by the virtual disk driver, data from the system output buffer to the memory buffer after adding the block offset, and marks the memory buffer dirty;

wherein if the reading or writing involves crossing a block boundary, only the bytes within the current block specified by the block index are read or written and the block index subsequently increases by 1, and the processing repeats (3) and continues, until all bytes are read or written.

8. The method of claim 7, wherein the device is one or more of a computer system, a computer-controlled device and an operating-system-controlled device.

9. The method of claim 7, wherein the algorithm to identify the slot to be freed in (8) is based on one or more of: Least Recently Used (LRU), Least Frequently Used (LFU), and First-In-First-Out (FIFO).

10. The method of claim 7, wherein (8) further comprises:
in response to determining that the memory buffer in the identified slot to be freed is marked as dirty, writing, by the virtual disk driver, contents of the memory buffer back to the Virtually Mapped Storage Medium.

11. The method of claim 10, wherein the writing by the virtual disk driver comprises:
calculating a physical address corresponding to the block index in the target slot according to the following formula:

physical memory address=virtual disk base address+ block index*block size.

12. The method of claim 10, wherein the writing by the virtual disk driver further comprises:
creating, using a memory management function, a virtual to physical memory mapping and writing data from the memory buffer in the target slot to the virtual memory address so created.

13. The method of claim 10, wherein, the writing by the virtual disk driver further comprises releasing the virtual to physical mapping.

* * * * *